July 8, 1958 H. C. PITTENGER 2,841,876
MICROMETER HEIGHT GAUGE
Filed Sept. 2, 1955 2 Sheets-Sheet 1
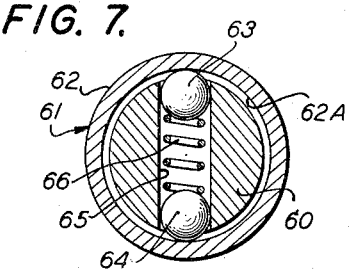
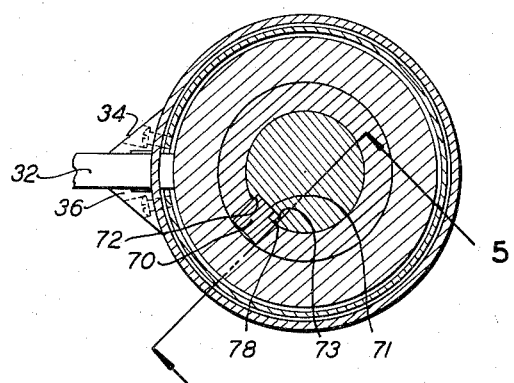
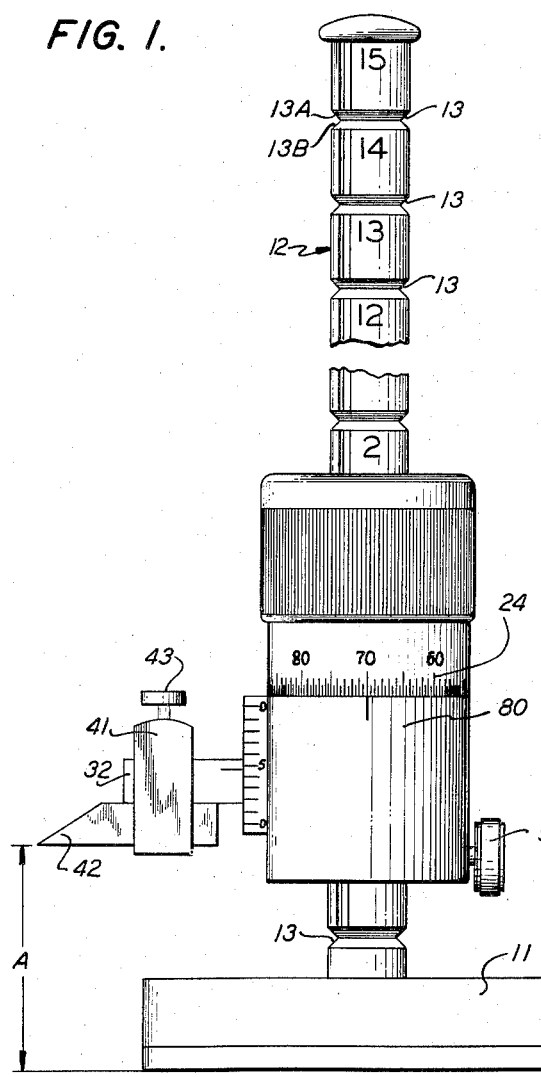
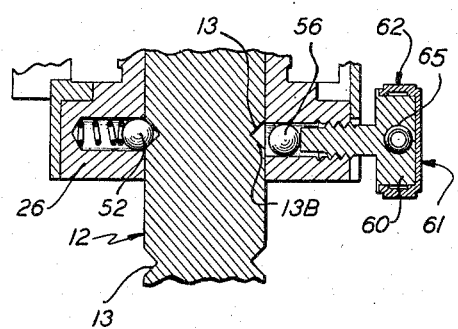
INVENTOR.
HAROLD C. PITTENGER
BY
Christie, Parker & Hale
ATTORNEYS July 8, 1958

H. C. PITTENGER 2,841,876

MICROMETER HEIGHT GAUGE

Filed Sept. 2, 1955

INVENTOR.
HAROLD C. PITTENGER

BY
Christie, Parker & Hale
ATTORNEYS

United States Patent Office 2,841,876
Patented July 8, 1958

2,841,876
MICROMETER HEIGHT GAUGE

Harold C. Pittenger, Los Angeles, Calif.

Application September 2, 1955, Serial No. 532,297

6 Claims. (Cl. 33—170)

The invention relates to instruments for precise measuring and more particularly to micrometer height gauges.

Accurate height gauges having measuring capacity in inches are difficult to construct because of the necessity for precise registry in a plurality of positions. Most height gauges having a range from 1 to 12 or more inches use an indexing post and a body having micrometer adjustments which read the position of an indicating arm movable with respect to the body. Conventionally, the post is indexed every inch and the body micrometer apparatus reads to thousandths of an inch. Precision is made difficult by the necessity of registering the body carrying the micrometer adjustment with respect to each of the inch indices on the post. The invention provides a means of registering the body precisely with respect to each of the indices.

A height gauge embodying the invention has a post with equally spaced circumferential grooves and a body slidable on the post. The sliding body supports in fixed axial relationship an internally threaded thimble nut that rotatably engages an externally threaded sleeve slidable on the body and carrying an extending indicator arm. A first detent means in the body has means manipulable to urge the first detent means into tangential contact with the post and the circumferential grooves therein. A second detent means located in the body, preferably diametrically opposed to the first detent means, has means urging the second detent means into tangential contact with the post and with the circumferential grooves therein as the body is displaced along the post. The second detent means is offset longitudinally of the body with respect to the first detent means.

The second detent means acts as a locator to register the first detent means adjacent a circumferential groove so that the first detent means may be urged into tangency with the faces of a circumferential groove, thus locating the body precisely with respect to the post.

Preferably, both of the detent means performing both the locating and locking functions of the body of the height gauge are precisely formed metallic spheres. Such spheres are available commercially in the form of the accurately gauged balls used in ball bearings. These balls or spheres are manufactured to extremely close tolerances and are extremely uniform in diameter.

In conventional height gauges, movement of the body longitudinally of the post results in a twisting motion which causes the locking detent to register against a different portion of the surfaces of a circumferential groove in separate settings in the same inch index on the post. The tendency to twist results in errors in measurements because the circumferential grooves cannot be perfectly ground. The usual practice is to lap the locking detent into each groove at a particular location on the groove until the indicating arm reads correctly on a master gauge. For this reason it is preferable to provide means for insuring that the locking detent registers against the identical portion of each circumferential groove in each succeeding setting of the body with respect to the post. Therefore, a preferred form of the invention is embodied in a precision height gauge having a post with equally spaced circumferential grooves and a body slidable on the post and supporting in fixed axial relationship an internally threaded thimble nut which rotatably engages an externally threaded sleeve. The sleeve is slidable on the body and carries an extending indicator arm. A shallow channel runs longitudinally of the post. A key slidable with the body extends into the longitudinal channel and bears against one wall thereof. The body contains first detent means and additional means urging the first detent means into tangential contact with the circumferential grooves therein as the body is displaced along the post and second detent means with additional means urging the second detent means into tangential contact with the post and with the circumferential grooves therein as the body is displaced along the post. The second detent means is displaced longitudinally of the body with respect to the first detent means so that the first detent means can be urged into tangency with a face of a circumferential groove while the second detent means is in tangential contact with both faces of a circumferential groove.

The advantage of having the second or locating detent means associated with the locking or first detent means is that the locating means, by registering the locking means adjacent a circumferential groove, enables the locking means to be tightened into place without the damage to the first detent means that might ensue if the means were forced against the periphery of the post.

A second measure for protecting the precise contacting areas of the first detent means is to use a torque screw to urge the first detent means into contact with the grooves. The torque screw limits the amount of pressure forcing the detent means into registry with the post and is an additional safeguard against damaging the detent means.

Further advantages and features of the invention will become apparent from the following detailed description and drawings in which:

Fig. 1 is an elevational view of a preferred embodiment of the invention;

Fig. 3 is a fragmentary sectional elevation of a portion of the device of Fig. 2;

Fig. 4 is a fragmentary section taken along line 4—4 of Fig. 2;

Fig. 7 is a sectional elevation taken along line 7—7 of Fig. 2.

Figures 2, 5, 6:
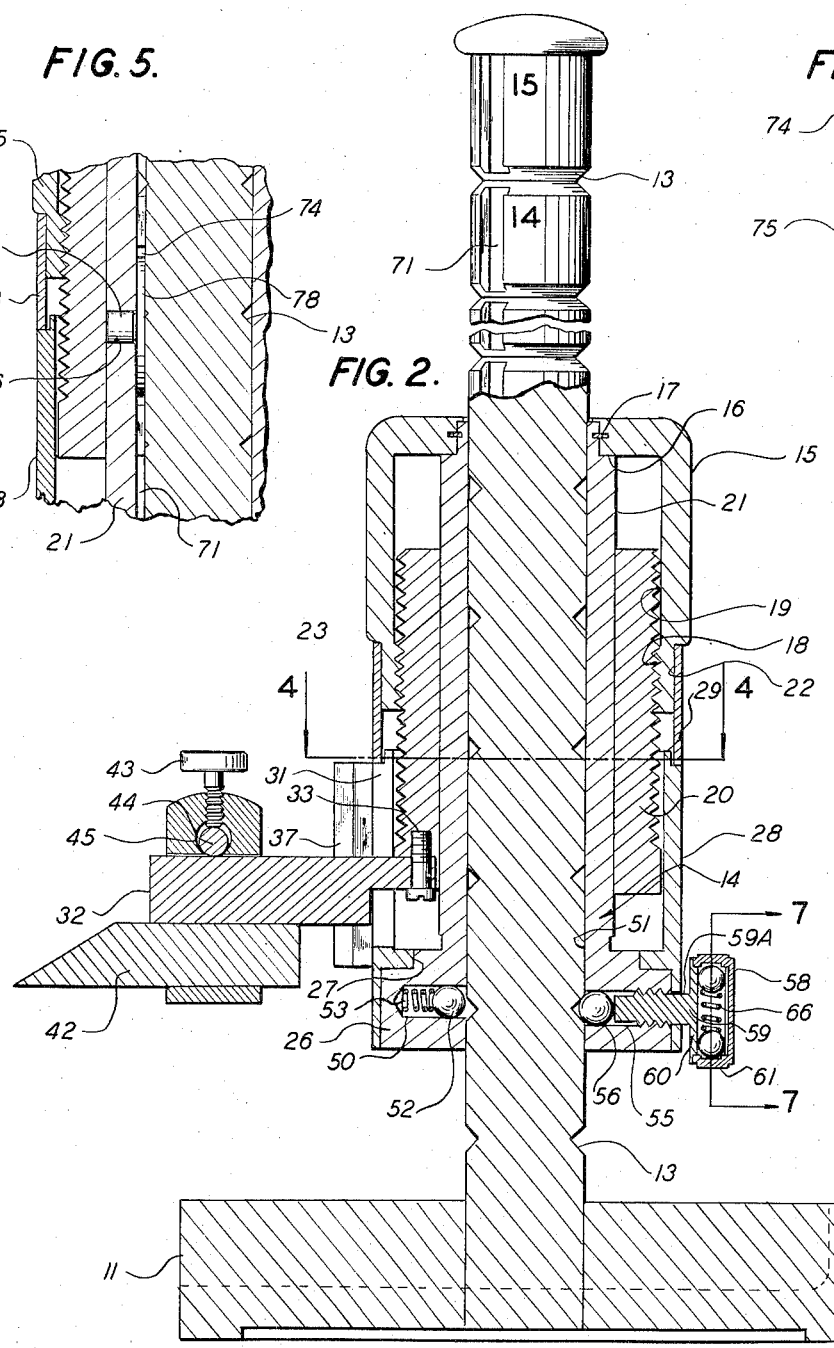
Fig. 2 is a partial sectional elevation of the embodiment of Fig. 1.
Fig. 5 is a fragmentary sectional elevation taken along line 5—5 of Fig. 4.
Fig. 6 is a detailed elevation of the key shown in Fig. 5.

The micrometer height gauge illustrated in Figs. 1 through 7 is a preferred embodiment of the invention designed to measure heights from 1 to 15 inches. It comprises a rectangular base 11 in which is fixed a vertical post 12 which has a plurality of circumferential grooves 13. The grooves are precisely spaced one inch apart longitudinally of the post. Each groove has an upper face 13A and a lower face 13B. The faces diverge from each other at approximately 110°. A substantially cylindrical body 14 slides on the post and supports a thimble nut 15 on an upper shoulder 16. The thimble nut is fixed axially with respect to the slidable body by a flat C-washer 17 recessed in the body and the thimble. The C-washer permits the thimble nut to be revolved about the body while maintaining its fixed axial relationship.

An internal thread 18 at the lower portion of the thimble nut engages an external thread 19 on a sleeve 20 which is slidable on an outer periphery 21 of the body. A reduced diameter portion 22 at the bottom of the thimble nut has press fitted to it an exterior sleeve 23 whose outer circumference bears a micrometer scale 24. The scale may be divided into 200 divisions which in the instant case read to half thousandths.

The body has a flange 26 at its bottom. The flange is recessed at 27 to receive a dust cover 28 which is concentric with the post and the body and fixed rigidly to the body. A lip 29 on the upper portion of the dust cover is overlapped by the bottom portion of micrometer sleeve 23. The dust cover has a longitudinally extending slot 31 through which extends an indicator arm 32. The indicator arm is fastened by a screw 33 to the bottom surface of externally threaded sleeve 20.

A pair of guide strips 34, 36 are fastened to the dust cover on either side of the indicator arm. Each guide strip has a machined inner face 37 which bears against a side surface of the indicator arm and acts to guide the vertical movement of the arm.

One of the guide sleeves is graduated on its outer face from 0 to 10 in tenths of an inch. An indexing line 38 is scribed on the indicator arm adjacent the graduations. The arm carries a tool bracket 41 which in turn carries a pointer 42. The pointer is clamped between the lower loop of the bracket and the lower surface of the indicator arm by means of a screw 43 threaded into the upper portion of the bracket. The screw thrusts against a cylindrical rod 44 which extends transversely of the indicator arm in an annular cavity 45 open adjacent the top surface of the indicator arm to permit the rod to bear against the arm.

The flange of the body has a horizontal cylindrical recess 50 opening into a cylindrical chamber 51 extending the length of the body to receive the vertical post. The recess seats a locating detent or ball 52 which is urged against the post by a compression spring 53. Diametrically opposed to recess 50 is a second recess 55 containing a locking detent or ball 56. Recess 55 extends from the outer periphery of the flange of the body through the flange and opens into chamber 51. The recess is tapped near its outer portion and a torque screw 58 is threaded into the hole. The inside diameter of each recess is slightly greater than the outside diameter of each ball so that the balls move freely in their respective recesses.

The inside diameter of the second recess should exceed the diameter of the locking ball within it by .007" or more to insure identical re-seating of the locking ball in a chosen indexing groove on every succeeding registry of the body with respect to the chosen groove.

Cylindrical detents with hemispherical inner ends may be used, but ball detents are preferred because of their commercial availability.

The torque screw is best described with reference to Figs. 3 and 7. A threaded shank 59 of the screw is integral with a thick flange 60 to which a head 61 is rotatably attached. A relieved portion 59A of the shank has a reduced diameter approximating the root diameter of the threads of the shank. The dust cover is cut out to slip around the relieved portion.

The head is a hollow cover having an annular rim 62 with an internal groove 62A. The groove is contacted by balls 63, 64 that are housed in a bore 65 extending transversely through the flange on a diametral line. A compression spring 66 is disposed in the bore between the balls and urges them against opposite portions of the internal groove of the head.

In operation the torque screw is used to urge a locking detent or ball 56 into tangency with the faces of the selected circumferential groove. The head 61 will rotate the shank of the screw until the load exerted on the ball equals the frictional load engendered between the groove and the balls by the force of the compression spring against the balls contained in the flange. Thus, by controlling the strength of the spring, a limit can be set on the force imposed against the locking ball.

Since it is desirable to fix the peripheral location of the locking detent with respect to each of the circumferential grooves, the preferred embodiment of the invention contains a key 70 extending into a shallow channel 71 defined by opposing walls 72, 73 running longitudinally in the post. As illustrated in Figs. 5 and 6, the key has a flat rectangular portion 74 which rides into the channel in the post and a cylindrical boss 75 which extends into a recess 76 in the wall of the body. The flat portion is cut out to form a clearance notch 77 for a leaf spring 78. The ends of the leaf spring are recessed into the long wall of the notch and the spring is compressed against wall 73 of the longitudinal channel in the post and forces the opposite edge of the key against wall 72 of the groove.

The spring-loaded key insures that the same face of the key is against the same wall of the channel, holding the body relative to the post so that the locking ball carried in the body registers against the identical portion of each circumferential groove during each setting of the body longitudinally with respect to the post.

Fig. 2 illustrates the body fixed in registry longitudinally with respect to the post by the tangential contact of the locking ball with the faces of the circumferential groove. Although aligned diametrically with respect to the locking ball, the locating detent or ball is displaced in the body longitudinally with respect to the post so that the two balls do not coincidentally register each against the two faces of the groove. The locating ball is longitudinally displaced with respect to the locking ball that amount which insures that the locking ball will be urged into contact with a face of a groove and not against the periphery of the post whenever the locating ball is registered against both faces of a groove.

For instance, in Fig. 3 torque screw 58 is threaded away from the locking ball so that the ball is withdrawn from the circumferential groove. The portion of the dust cover extending to approximately the root diameter of the screw blocks removal of the screw. The compression spring urges the locating ball into tangency with both faces of the circumferential groove. The spring urges the locating ball into tangency with each succeeding circumferential groove as the body moves longitudinally of the vertical post. The divergency of the faces of each groove is such that vertical pressure against the body overcomes the spring and the locating ball rides out of the groove and allows the body to be moved longitudinally of the post as long as the torque screw is threaded out against the dust cover so that the locking ball is removed from tangency with the groove. The relative vertical displacement of the locating ball with respect to the locking ball is such that inward movement of the torque screw will bring the locking ball into contact with lower face 13B of each circumferential groove that is tangentially contacted by the locating ball. Therefore, when the locating ball is in place, that is, tangentially contacting the circumferential groove, the locking ball will always be urged against a face of the groove and not against the periphery of the post, with a resultant lessening of the possibilities of damaging the precise locking ball.

In operation the torque screw is threaded out until it stops against the dust cover and then the body is moved vertically along the post until the desired inches of height appears directly above the thimble nut on the post. For instance, in Fig. 1 the numeral 2 is visible on the post above the thimble nut. This indicates that the locating ball is in registry with the circumferential groove locating the body at least two inches above the registry surface upon which the base of the height gauge is set. A surface plate commonly provides the registry surface. The body is then locked into position by turning the torque screw against the locking ball forcing the locking ball into tangency with both faces of the circumferential groove. When the desired loading of the ball against the groove is reached, the head of the torque screw will slip and no more force will be exerted against the locking ball.

The thimble nut has ten threads to the inch so that ten revolutions of the thimble nut will lift the sleeve carrying the indicator arm an inch with respect to the body. The graduations on the guide post indicate the tenths of an inch that the indicator arm is moved with respect to the basic setting of the body in registry with the chosen circumferential groove. An indexing mark 80 on the dust cover indicates the micrometer reading in thousandths to be added to the tenths reading obtained from the graduation on the guide strip. For instance, the pointer of the indicator arm in Fig. 1 is set the distance A above the registry surface. The reading on the post shows two inches above the surface, the guide strip graduations show .4 of an inch in addition and the micrometer shows an additional .070. Therefore, the pointer of the micrometer height gauge is set at 2.470 inches above the registry surface.

I claim:

1. In a precision gauge having a post with equally spaced circumferential grooves and a body slidable on the post supporting in fixed axial relationship an internally threaded thimble nut threadably engaging an externally threaded sleeve slidable on the body and carrying an extending indicator arm, the combination comprising a first detent means in the body, means manipulable to urge the first detent means into tangential contact with the circumferential grooves in the post, a second detent means in the body, and means urging the second detent means into tangential contact with the post and with the circumferential grooves therein as the body is displaced along the post, the second detent means being offset longitudinally of the body with respect to the first detent means.

2. In a precision gauge having a post with equally spaced circumferential grooves and a body slidable on the post supporting in fixed axial relationship an internally threaded thimble nut threadably engaging an externally threaded sleeve slidable on the body and carrying an extending indicator arm, the combination comprising two spaced walls defining a shallow longitudinal channel in the post, means slidable with the body extending into the longitudinal channel and bearing against one wall thereof, a first detent means in the body, means manipulable to urge the first detent means into tangential contact with the circumferential grooves in the post, a second detent means in the body, and means urging the second detent means into tangential contact with the post and with the circumferential grooves therein as the body is displaced along the post, the second detent means being offset longitudinally of the body with respect to the first detent means.

3. In a precision gauge having a post with equally spaced circumferential grooves and a body slidable on the post supporting in fixed axial relationship an internally threaded thimble nut threadably engaging an externally threaded sleeve slidable on the body and carrying an extending indicator arm, the combination comprising first means manipulable to extend into a circumferential groove for locking the body in registry with the groove, and second means urged into a groove prior to locking for locating the first means adjacent a circumferential groove.

4. In a precision gauge having a post with equally spaced circumferential grooves and a body slidable on the post supporting in fixed axial relationship an internally threaded thimble nut threadably engaging an externally threaded sleeve slidable on the body and carrying an extending indicator arm, the combination comprising a locking detent ball in the body, a torque screw manipulable to urge the locking ball into tangential contact with a circumferential groove, a locating detent ball in the body, and a spring urging the locating detent ball into tangential contact with the post and the circumferential grooves therein as the body is displaced along the post, the locating detent ball being longitudinally displaced in the body with respect to the locking detent ball so that the locking detent ball can be urged into tangency with a face of a circumferential groove while the locating detent ball is in tangential contact with both faces of a circumferential groove.

5. In a precision gauge having a post with equally spaced circumferential grooves and a body slidable on the post supporting in fixed axial relationship an internally threaded thimble nut threadably engaging an externally threaded sleeve slidable on the body and carrying an extending indication arm, the combination comprising locking means in the body for securing the body in registry with a circumferential groove, locating means in the body registering the locking means adjacent a circumferential groove prior to locking, spaced walls defining a shallow longitudinal channel in the post, and a key extending from the body into and against one wall of the channel fixing the body with respect to the post so that the locking means registers against identical portions of each groove in each succeeding registering of the body with respect to the post.

6. In a precision gauge having a post with equally spaced circumferential grooves and a body slidable on the post supporting in fixed axial relationship an internally threaded thimble nut threadably engaging an externally threaded sleeve slidable on the body and carrying an extending indicator arm, the combination comprising a locking detent ball in the body, a torque screw manipulable to urge the locking ball into tangential contact with a circumferential groove, a locating detent ball in the body, a spring urging the locating detent ball into tangential contact with the post and the circumferential grooves therein as the body is displaced along the post, the locating detent ball being axially displaced in the body along the axis of the post with respect to the locking detent ball so that the locking detent ball can be urged into tangency with a face of a circumferential groove while the locating detent ball is in tangential contact with both faces of a circumferential groove, spaced walls defining a shallow longitudinal channel in the post, a key extending from the body into the channel, and means urging the key against one wall of the channel fixing the body with respect to the post so that the locking means registers against identical portions of each groove in each succeeding registering of the body with respect to the post.

References Cited in the file of this patent

UNITED STATES PATENTS

| Number | Name | Date |
| --- | --- | --- |
| 305,337 | Russom | Sept. 16, 1884 |
| 821,721 | Kreutzkamp | May 29, 1906 |
| 1,282,030 | Benemelis | Oct. 22, 1918 |
| 1,291,711 | Auer | Jan. 21, 1919 |
| 1,576,797 | Schustarich | Mar. 16, 1926 |
| 1,908,703 | Flatt | May 16, 1933 |